June 28, 1966 S. H. UPDIKE 3,257,796
TURBOCHARGER CONTROL SYSTEM
Filed Sept. 20, 1963 2 Sheets-Sheet 1
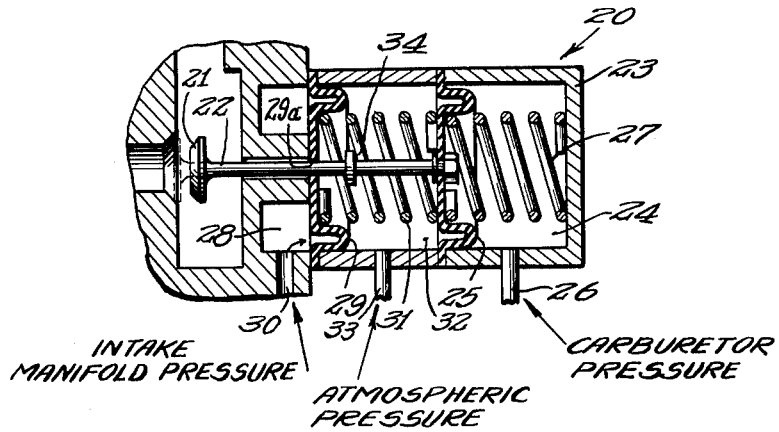
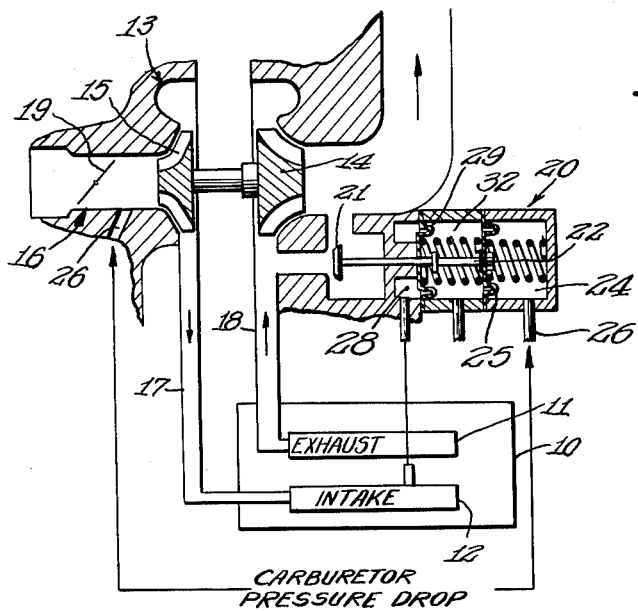
INVENTOR.
Stanley H. Updike
BY
ATTORNEYS June 28, 1966  S. H. UPDIKE  3,257,796
TURBOCHARGER CONTROL SYSTEM Filed Sept. 20, 1963  2 Sheets-Sheet 2

INVENTOR.
Stanley H. Updike
BY
ATTORNEYS

United States Patent Office 3,257,796
Patented June 28, 1966

3,257,796
TURBOCHARGER CONTROL SYSTEM
Stanley H. Updike, Mentor, Ohio, assignor to
TRW Inc., a corporation of Ohio
Filed Sept. 20, 1963, Ser. No. 310,297
9 Claims. (Cl. 60—13)

The present invention relates to improvements in control systems for turbochargers for internal combustion engines.

In a turbocharged gasoline engine such as the type for use on automobiles and embodied in the present invention, the turbocharger will essentially comprise a shaft with a compressor impeller on one end and a turbine wheel at the other end. The air fuel mixture enters the compressor and is compressed and passes to the intake manifold of the engine and thence to the combustion chambers. As the exhaust gases leave the combustion chambers and flow through the exhaust manifold they have increased to a considerably higher volume and temperature, and the exhaust gas rotates the turbine wheel for operating the compressor. Since there is considerably more volume of gas going through the turbine wheel than through the compressor useful work is obtained out of the system and the air fuel mixture passes into the cylinder at a much higher than atmopheric pressure. Thus more pounds of air can be delivered to the engine compared to one which is naturally aspirated and therefore more fuel can be burned and more power obtained from the engine.

In the conventional carburetor for a gasoline engine the turbocharger cannot be practically used at partially open throttle position. The throttle and turbocharger are in effect working against each other since the throttle valve is tending to reduce the flow of air into the intake manifold and the turbocharger is tending to increase the air flow. To operate the turbocharger throughout the full range of engine operation at part throttle positions is inefficient and disadvantageous in that (a) this increases temperature of entering air, (b) this results in higher exhaust back pressures, (c) both of the foregoing reduce fuel economy, (d) there is a resultant loss of density of intake air, and (e) turbocharger operation is provided when it is not actually needed.

In automobile engines it is desirable to provide for maximum power to obtain maximum acceleration at low engine speeds. This accomplished by reducing the size of the turbine housing to increase turbine speeds with less exhaust gases. However, this tends to overdrive the turbine at higher engine speeds. It is accordingly desirable for obtaining optimum turbocharger design to provide turbocharging operation at low engine speeds and control the turbocharger preventing it from being overdriven at higher engine speeds.

The foregoing problems are solved and a turbocharger of optimum usefulness and efficiency is obtained in accordance with the present invention by providing a turbocharger wherein the turbine has a normal predetermined speed which is a predetermined function of engine exhaust gas mass flow and temperature selected to provide adequate turbocharging at low engine speeds, and providing a first control means for reducing the speed of the turbine below the normal speed at throttle positions less than full throttle. A second control means is further provided which reduces the speed of the turbine below said normal speed at intake manifold pressures in excess of a predetermined pressure, operative after full throttle position.

An object of the present invention is to provide an improved turbocharger control mechanism which operates a turbocharger at a normal speed at full throttle positions with the normal speed being a predetermined function of engine exhaust gas mass flow and temperature and which reduces the output of the turbocharger below said normal speed or in effect removes the turbocharger from the system at part throttle operating conditions and reduces the normal speed of the turbocharger at a predetermined maximum intake manifold pressure.

A further object of the invention is to provide an improved reliable turbocharger control which provides a fail safe operation of preventing overspeeding and overdelivery of the turbocharger in case of the failure of the mechanism which limits turbocharger operation at maximum intake manifold pressure.

A further object of the invention is to provide a turbocharger control which provides a fail safe operation and which permits at least part operation of the turbocharger upon failure of the device which limits operation at less than full throttle positions so that failure will be reflected in engine performance as a warning signal.

A further object of the invention is to provide a control system for a turbocharger with controls of the type above described wherein failure of either control will prevent overboosting of the engine and overoperation of the turbocharger and will reflect in engine performance as a warning signal.

Other objects, advantages and features will become more apparent with the teaching of the principles of the invention in connection with the disclosure of the preferred embodiment thereof in the specification, claims and drawings, in which:

FIGURE 1 of the drawings is a schematic showing of a control system with an engine constructed and operating in accordance with the principles of the present invention;

FIGURE 2 is an enlarged detailed schematic view of the control mechanism;

On the drawings:

Figure 3:
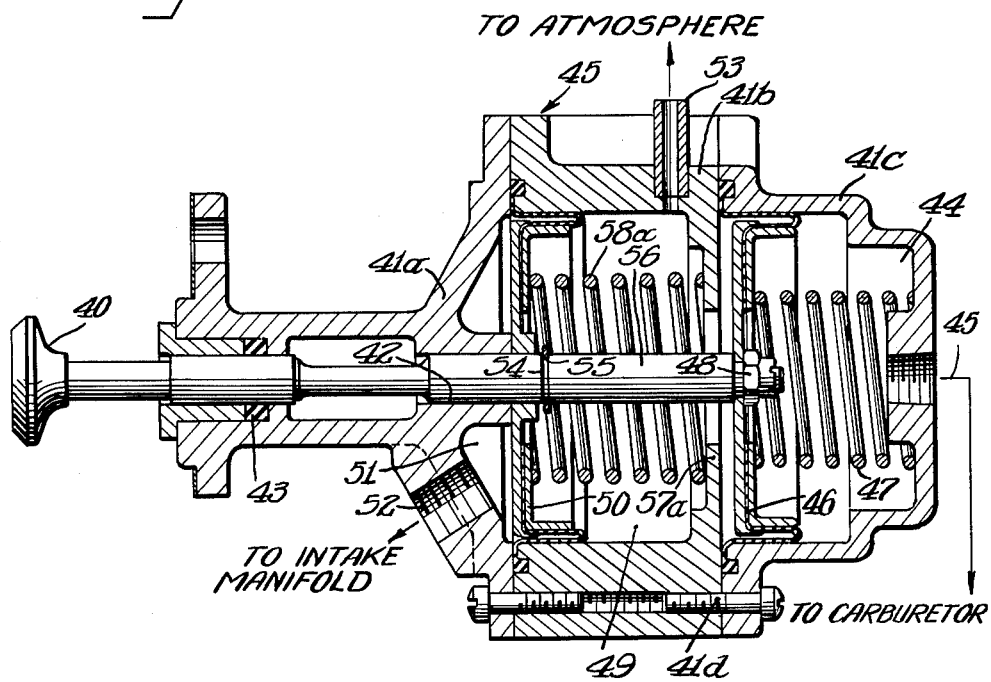
FIGURE 3 is a sectional view through a control mechanism of slightly modified form.

FIGURE 1 illustrates schematically an engine 10 with an exhaust manifold 11 and an intake manifold 12. The engine is turbocharged by a turbocharger 13 having a turbine section 14 and a compressor section 15.

The compressor 15 receives an air fuel mixture from a carburetor 16 with a throttle valve 19 therein. The air fuel mixture is delivered to the intake manifold 12 through a conduit 17. Exhaust gas for driving the turbocharger is delivered through a conduit 18 to the turbine 14.

Means are provided for regulating the operation of the turbine and for reducing its speed below its normal speed. The turbine is originally designed to operate at a predetermined normal speed which is a function of the gas mass flow and temperature of the exhaust from the engine. In an engine such as an automobile engine the turbine is made small so that it will operate at low engine speeds to obtain automobile acceleration. For reducing the speed of the turbine below said normal speed suitable gas control means are provided shown preferably in the form of a poppet valve 21 which opens to bypass exhaust gas.

A control mechanism 20 in effect removes the turbocharger from the system bypassing the gas by opening the bypass valve 21 at engine operation less than full throttle position. The control 20 also reduces the delivery of gas to the turbocharger when a predetermined intake manifold pressure is reached to prevent overcharging.

Figure 4:
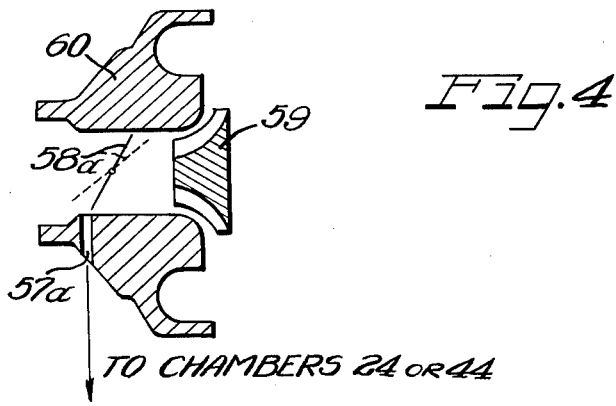
FIGURE 4 is a fragmentary sectional view in somewhat schematic form, of a modified arrangement for connection of the carburetor pressure drop line.

The control as shown in FIGURES 1 and 2 is embodied in a housing 23 having a first chamber 24 therein with a movable wall or diaphragm 25 across the chamber 24. A carburetor pressure line 26 is connected to the chamber and this line leads from the carburetor 16 at a location between the throttle valve 19 and the compressor 15 of the turbocharger 13 (another location is illustrated in the arrangement of FIGURE 4 which will be explained later herein). At the other side of the diaphragm 25 is a chamber 32 which has an inlet 33 open to atmospheric pressure so that the diaphragm in effect measures the carburetor pressure drop.

Within the chamber 24 is a compression spring 27 acting against the diaphragm 25 moving it to move the stem or rod 22 of the valve 21 to close the valve 21.

When the engine is stopped so that atmospheric pressure is within the chamber 24, the spring 27 will hold the valve 21 at the closed dotted line position of FIGURE 2. As soon as the engine is started, vacuum in the chamber 24 will move the valve 21 and its rod or stem 22 in a first direction opening the valve.

Rupture of the diaphragm 25 due to wear or defects will permit the spring 27 to close or partly close the valve 21 (depending on the size of leak or rupture in the diaphragm 25) inasmuch as the spring 27 is stronger than a spring 31 on the opposite side of the diaphragm 25 (the arrangement of FIGURE 3 has a structure wherein a spring corresponding to spring 31 is independently supported). This will cause operation of the turbocharger at less than fully open throttle position and will immediately be reflected in engine performance which can be detected by the operator. It will be reflected in a loss of engine efficiency and can be readily detected if devices such as intake manifold pressure gauges are provided for the engine.

The diaphragm 25 will bypass the gas from the turbocharger at all engine operating conditions up to fully open throttle. When fully open throttle is reached, the pressure in the chamber 24 will increase sufficiently so that the spring 27 will close the valve 21.

A second chamber 28 is provided within the housing 23 with a movable wall or diaphragm 29 exposed to the chamber 32 and to the chamber 28. An intake manifold pressure line 30 leads to the chamber 28 so that as intake manifold pressure increases with turbocharging (after full throttle position) the diaphragm 29 will move to the right from the position shown in the drawings. The diaphragm is coaxial with the diaphragm 25 and has an opening 29a through its center to permit movement of the valve stem 22 relative thereto, and to permit movement of the diaphragm to the right relative to the stem. The opening 29a has a close fit or a sliding seal.

A stop or valve operator 34 is secured to the stem 22 and is engaged by the diaphragm 29 at a maximum predetermined intake manifold pressure. Thus when said maximum pressure is reached the diaphragm will begin moving the valve 21 to open position to prevent overcharging of the engine.

The coil compression spring 31 is located in the atmospheric pressure chamber 32 between the diaphragms 25 and 29. This spring 27 has a greater spring force than the spring 31 so that spring 27 can compress spring 31 and hold the valve 21 closed when the pressures on opposite sides of the diaphragm 25 are equal. The spring 31 is such that the diaphragm will overcome the force of the spring 31 sufficiently to engage the stop 34 at said maximum intake manifold pressure.

The spring 31 is conveniently nested between the diaphragms 25 and 29, or if desired, the right ends of the spring can be mounted on a support within the chamber which is provided for that purpose and which is omitted from the arrangement of FIGURES 1 and 2.

In operation, before starting the engine the valve 21 will be held closed by the spring 27. When the engine is started the pressure drop past the throttle valve 19 will cause the diaphragm 25 to open the valve 21 and it will stay open until fully open throttle position is reached whereupon the spring 27 will again close the valve 21. The valve will remain closed until a maximum predetermined intake manifold pressure is reached whereupon the diaphragm 29 will have moved to the right sufficiently to engage the stop 34 and again open the valve 21.

In the arrangement of FIGURES 1 and 2, the spring 31 acts in opposition to the spring 27 so that the net spring force acting on the diaphragm 25 is a relatively small force that can be overcome by the pressure differential across the diaphragm 25. This pressure differential is the pressure differential across the throttle valve 19. However since the spring 31 is supported on the diaphragm 29, when it engages a stop 34 it acts against the full force of the spring 27. With this spring arrangement a relatively small force can move the valve by operating on the diaphragm 25 and a larger force operating on the diaphragm 29 is required to operate the valve 22. As will be explained later herein, in the arrangement of FIGURE 3 the springs are not in opposition but the diaphragm which measures intake manifold pressure must act against both springs 47 and 58a.

Thus it will be seen that I have provided an improved control mechanism which meets the objects and advantages above set forth. The control mechanism is simple in operation and eliminates the need for exposed linkages operated from throttle control linkage mechanisms and the entire operating arrangement of the control may be contained within a single housing protected from dirt and foreign elements.

The unit is fail safe in operation and if either diaphragm fails the valve will operate abnormally so that failure can be detected by the operator. If the diaphragm 25 fails supercharging at part throttle operation will result which can be readily detected. If the diaphragm 29 fails the gas flows into the intermediate chamber 32 and will move the diaphragm 25 to the right to open the valve 21, thus preventing overcharging. For this purpose the atmospheric pressure line 33 should be smaller than intake manifold pressure line 30 in order to permit build up of pressure in the chamber 32. Thus failure of either diaphragm cannot result in damage to the engine or unsafe performance.

In the arrangement of FIGURE 3 a slightly modified form is illustrated with a valve 40 being arranged to control the by-pass of exhaust gases similar to the valve 21, and the passages are omitted for clarity of the drawing. The valve and control chambers are supported and contained in a housing 41 having parts 41a, 41b and 41c which are suitably clamped together such as by bolts 41d and the parts have adequate gaskets between them which may be provided by the edges of the diaphragms.

The valve 40 has a valve stem 56 slidably supported in the housing in a guide 42 and another guide 43 which includes a seal to prevent the flow of exhaust gases along the valve stem.

Within the housing is defined a first chamber 44 having a line 45 leading thereto which is connected to the carburetor and corresponds to the line 26 in the arrangement of FIGURES 1 and 2. The line 45 is connected to the carburetor at the location shown in the arrangement of FIGURE 1 or at the location in the arrangement shown in FIGURE 4. At the end of the chamber is a movable wall 46 formed by a diaphragm with a rigid center support and a spring 47 urges the wall or diaphragm 46 to the left to urge the valve 40 to a closed position which is the position of maximum exhaust gas flow to the turbine.

At the other end of the housing is a second chamber 51 and an intake manifold pressure line 52 connects to the chamber 51. The chamber has a movable wall 50 formed of a diaphragm with a central stiffening plate. The wall or diaphragm 50 is urged to the left by a second spring 58a which is supported on an annular flange 57a on housing part 41b. The strength of spring 58a is such that the diaphragm 50 will not be pushed to the right until a predetermined intake manifold pressure is reached, and at that time the diaphragm will move to the right and engage a stop in the form of a snap ring 55 in a groove 54 on the valve stem 56. This will begin to open the valve 40 to limit supercharging of the engine.

The operation is substantially the same as with the structure of FIGURES 1 and 2, and manifold vacuum in the line 45 will maintain the valve 40 open until full throttle position. At full throttle position the valve 40 will be closed for supercharging the engine and for delivering maximum exhaust gases to the turbocharger. At a predetermined maximum intake manifold pressure the diaphragm 50 will begin to open the valve 40. The diaphragm 50 must act against the force of both of the springs 47 and 58a as it moves the valve toward open position.

Thus, in both of the arrangements of FIGURE 2 and of FIGURE 3, the structure includes a valve means 22, 40 which is moveable to a first position where the valve is closed and the turbocharger is operated and which is moveable to a second position where the gases are by-passed. Both of the structures of FIGURES 2 and 3 also include a first pressure sensing means which are the diaphragms 25, 46 and their pressure chambers 24, 44 which measure pressure drop across the throttle valve, and a second pressure sensing means which includes diaphragms 29, 50 and their chambers 32, 49, which measures intake manifold pressure. The first pressure sensing means moves the valve to the second or open position at full throttle, and the second pressure sensing means moves the valve to second position at maximum supercharger pressure. Both arrangements of FIGURES 2 and 3 include biasing means acting on the valve arranged so that the relatively smaller pressure differential, which is the drop across the throttle valve of the carburetor, can operate the valve, and so that the relatively larger pressure differential, which is the intake manifold pressure at supercharging conditions, can operate the valve. The biasing means operates against the two diaphragms, and in the arrangements of FIGURE 2 these springs 27 and 34 act in opposition to each other to give the lower spring resistance. In the arrangement of FIGURE 3 only one spring 47 operates against the first diaphragm 46 to give the lower spring resistance. In the arrangement of FIGURE 2 the higher spring resistance is offered by the spring 27 acting alone. In the arrangement of FIGURE 3 a higher spring resistance is provided by both of the springs 58a and 47 acting together.

With reference to FIGURE 4, an arrangement is provided wherein the by-pass valve will close at idle position of the throttle valve but will open when the throttle is cracked. When the throttle is moved rapidly from idle posiion to the full open position, the by-pass valve will remain closed thus avoiding the small time delay required to move the by-pass valve from open to close position. This is advantageous in automotive operation when the driver suddenly moves the accelerator from release position to full throttle position for instantly obtaining maximum power.

In the arrangement of FIGURE 4 carburetor housing 60 has a throttle valve 58 therein and a carburetor passage leads to a compressor rotor 59. The throttle valve is shown in full line in the idle position and in dotted line in its position when it is just cracked when moving out of idle position.

A carburetor pressure drop line 57 is positioned so that it opens into the carburetor passage at a location so that it is exposed to atmospheric pressure upstream of the throttle valve at the idle position of the throttle valve 58. However, as soon as the throttle valve 58 is cracked and moved away from idle position, the line 57 is exposed to substantially the pressure downstream of the throttle valve.

Thus in the idle position of throttle valve, the line 57 (which will connect to line 26 in the arrangement of FIGURE 1 or to line 45 in the arrangement of FIGURE 3) will be at atmospheric pressure. Thus the chambers 24 and 44 in FIGURES 2 and 3 respectively, will be at atmospheric pressure so that the springs 27 and 47 respectively will close the valves 21 and 40. If the throttle valve was moved suddenly to full open position the by-pass valves 21 and 40 will remain in closed position therefore any time lag which would be encountered in requiring them to move from open to close position is avoided. If the throttle valve 58 is moved from the idle position to normal operating positions less than full throttle, the valves 21 and 40 will open since line 57 will be exposed to the vacuum of the carburetor downstream of the throttle valve.

The operating mechanism for the turbocharger valve may be used in the control of a turbocharger for a diesel engine. In a diesel engine the fail safe features of the valve operating mechanism can be fully employed. For diesel operation, in the structure of FIGURE 2 the carburetor pressure line 26 which leads to the first chamber 24 will be open to atmosphere. In the structure of FIGURE 3 the line 45 leading to the chamber 44 will be open to atmosphere.

In diesel operation there is no by-passing of turbocharger operating gases at slow speeds and the turbocharger will be operative throughout the range of engine speed. However, at a predetermined maximum intake manifold pressure the turbocharger operation will be curtailed by opening of the by-pass valve. This of course results from connecting the intake manifold pressure passages, shown at 30 in FIGURE 2, and shown at 52 in FIGURE 3, to the intake manifold of the diesel engine.

In fail safe operation if the diaphragm 29 of FIGURE 2, or 50 of FIGURE 3 ruptures, the intermediate chamber 32 or 49 of FIGURES 2 and 3 respectively will become pressurized. This will permit intake manifold pressure to immediately act on the diaphragms 25 or 46. The by-pass valve will open at lower intake manifold pressures, and the engine operator will be able to observe that the lower diaphragm has ruptured due to change in turbocharger operation and resultant change in engine operation.

Thus with either a gasoline engine or a diesel engine the mechanism operates fail safe and functions both to prevent over speeding of the turbocharger upon failure of the lower diaphragm and to notify the operator due to change in engine performance.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A turbocharger control for an internal combustion engine comprising, a valve means moveable to a first position where the turbocharger is operated by exhaust gases being directed to the turbocharger and a second position where the gases are bypassed, a first pressure sensing means measuring pressure drop across the throttle valve of an engine moving the valve means to said second position until full throttle, a second pressure sensing means measuring intake manifold pressure and moving the valve means to said second position at a maximum supercharged pressure, and a biasing means acting on said valve means for urging the valve means to said first position and opposing said first and said second pressure sensing means, said biasing means opposing said first pressure sensing means with a first force and opposing said second pressure sensing means with a second force greater than the first force.

2. A turbocharger control for an internal combusition engine comprising, a valve means moveable to a first position where the turbocharge is operated by exhaust gases being directed to the turbocharger and a second position where the gases are bypassed, a first pressure sensing means measuring pressure drop across the throttle valve of an engine moving the valve means to said second position until full throttle, a second pressure sensing means measuring intake manifold pressure and moving the valve means to said second position at a maximum supercharged pressure, and a biasing means acting on said valve means including a first spring for urging the valve means to said first position, and including a second spring opposed to the first spring but weaker than said first spring so that said first pressure sensing means is aided by the second spring and acts against the first spring, said second pressure sensing means moving the valve means to said second position against the first spring only so that said biasing means opposes said first pressure sensing means with a first force and opposes said second pressure sensing means with a second force greater than said first force.

3. A turbocharger control for an internal combustion engine comprising, a valve means moveable to a first position where the turbocharger is operated by exhaust gases being directed to the turbocharger and a second position where the gases are bypassed, a first pressure sensing means measuring pressure drop across the throttle valve of an engine moving the valve means to said second position until full throttle, a second pressure sensing means measuring intake manifold pressure and moving the valve means to said second position at a maximum supercharged pressure, and a biasing means acting on said valve means including a first spring for urging the valve means to said first position resisting the first pressure sensing means, and including a second spring for acting on said valve means, said first spring acting alone to oppose said first pressure sensing means with a first force and said first and said second spring acting together to oppose said second pressure sensing means with a second force greater than said first force.

4. A turbocharger control for an internal combustion engine comprising, a valve means moveable to a first position where the turbocharger is operated by exhaust gases being directed to the turbocharger and a second position where the gases are bypassed, a first pressure sensing means measuring pressure drop across the throttle valve of an engine moving the valve means to said second position until full throttle, a second pressure sensing means measuring intake manifold pressure and moving the valve means to said second position at a maximum supercharged pressure, said second pressure sensing means including a pressure chamber connected to intake manifold pressure with a diaphragm moveable in response to said manifold pressure and connected to the valve means, a lost motion connection between the valve means and diaphragm permitting movement of the valve means independent of the diaphragm due to operation of the first pressure sensing means with said diaphragm positively moving the valve after a predetermined movement of the diaphragm, and a biasing means acting on said valve means for urging the valve means to said first position and opposing said first and said second pressure sensing means, said biasing means opposing said first pressure sensing means with a first force and opposing said second pressure sensing means with a second force greater than the first force.

5. A turbocharger control for an internal combustion engine comprising, a valve means moveable to a first position where the turbocharger is operated by exhaust gases being directed to the turbocharger and a second position where the gases are bypassed, a first pressure sensing means measuring pressure drop across the throttle valve of an engine moving the valve means to said second position until full throttle, a second pressure sensing means measuring intake manifold pressure and moving the valve means to said second position at a maximum supercharged pressure, said second pressure sensing means including a pressure chamber connected to intake manifold pressure with a diaphragm moveable in response to said manifold pressure and connected to the valve means, a stop connected to the valve means and engageable by the diaphragm after a predetermined movement so that after engaging the stop the diaphragm moves said valve means to said second position, and a biasing means acting on said valve means for urging the valve means to said first position and opposing said first and said second pressure sensing means, said biasing means opposing said first pressure sensing means with a first force and opposing said second pressure sensing means with a second force greater than the first force.

6. A turbocharger control for an internal combustion engine comprising, a valve means moveable to a first position where the turbocharger is operated by exhaust gases being directed to the turbocharger and a second position where the gases are bypassed, a first pressure sensing means measuring pressure drop across the throttle valve of an engine moving the valve means to said second position until full throttle, said first pressure sensing means including a first pressure chamber connected to pressure downstream of the throttle valve of an engine with a first diaphragm moveable in response to a pressure drop across the throttle valve and connected to the valve means, a second pressure sensing means measuring intake manifold pressure and moving the valve means to said second position at a maximum supercharged pressure, said second pressure sensing means including a pressure chamber connected to intake manifold pressure with a second diaphragm moveable in response to said manifold pressure and connected to the valve means, a lost motion connection between the valve means and second diaphragm permitting movement of the valve means independent of the second diaphragm due to operation of the first pressure sensing means with said diaphragm positively moving the valve after a predetermined movement of the second diaphragm, and a biasing means acting on said valve means for urging the valve means to said first position and opposing said first and said second pressure sensing means, said biasing means opposing said first pressure sensing means with a first force and opposing said second pressure sensing means with a second force greater than the first force.

7. A turbocharger control for an internal combustion engine comprising,
- a valve means moveable to a first position where the turbocharger is operated by exhaust gases being directed to the turbocharger and a second position where the gases are bypassed,
- a first pressure sensing diaphragm having a pressure chamber connected to pressure downstream of the throttle valve and measuring pressure drop across the throttle valve of an engine moving the valve means to said second position until full throttle,
- a second diaphragm having an intake manifold pressure chamber measuring intake manifold pressure and moving the valve means to said second position at maximum supercharged pressure,
- a stop on the valve means engageable by the second diaphragm after a predetermined travel,
- a first spring acting against the first diaphragm urging the valve means to first position,
- a second spring mounted on the second diaphragm and acting in opposition to the first spring,
- and an atmospheric pressure chamber between the two diaphragms.

8. A turbocharger control for an internal combustion engine comprising,
- a valve means moveable to a first position where the turbocharger is operated by exhaust gases being directed to the turbocharger and a second position where the gases are bypassed,
- a first diaphragm having a chamber and measuring pressure drop across the throttle valve of an engine moving the valve means to said second position until full throttle,
- a second pressure sensing diaphragm having a chamber and measuring intake manifold pressure and moving the valve means to said second position at maximum supercharged pressure,
- a first spring acting on said first diaphragm for urging the valve means to said first position,
- a second spring acting on said second diaphragm urging it in a direction to permit movement of the valve means to said first position,
- and a stop on the valve means engageable by the second diaphragm after a predetermined movement for moving the valve to said second position with the second diaphragm acting against said first and second springs.

9. A turbocharger control in accordance with claim 1 wherein said first pressure sensing means includes a moveable pressure responsive wall and said second pressure sensing means includes a second pressure responsive moveable wall with said walls respectively including first and second pressure chambers outwardly thereof,
- an atmospheric pressure chamber between the walls,
- an atmospheric pressure opening into the chamber between the walls,
- and an intake manifold pressure opening into the chamber for said second wall,
    - said intake manifold pressure opening being larger than said atmospheric pressure opening so that a pressure will build up in the chamber between the walls with rupture of said second wall.

References Cited by the Examiner

UNITED STATES PATENTS

| | | | |
|---|---|---|---|
| 2,651,297 | 9/1953 | Eastman | 123—119 |
| 2,667,150 | 1/1954 | Coar | 123—119 |
| 3,035,408 | 5/1962 | Silver | 60—13 |
| 3,104,520 | 9/1963 | Cazier et al. | 60—13 |

MARK NEWMAN, *Primary Examiner.*

KARL J. ALBRECHT, SAMUEL LEVINE, *Examiners.*

L. M. GOODRIDGE, *Assistant Examiner.*